June 24, 1930.  H. PAXTON  1,766,144
NAIL PICKING DEVICE FOR NAILING MACHINES
Filed Nov. 28, 1928   3 Sheets-Sheet 2

Hale Paxton INVENTOR.
BY
Francis C. Heebner
ATTORNEYS.

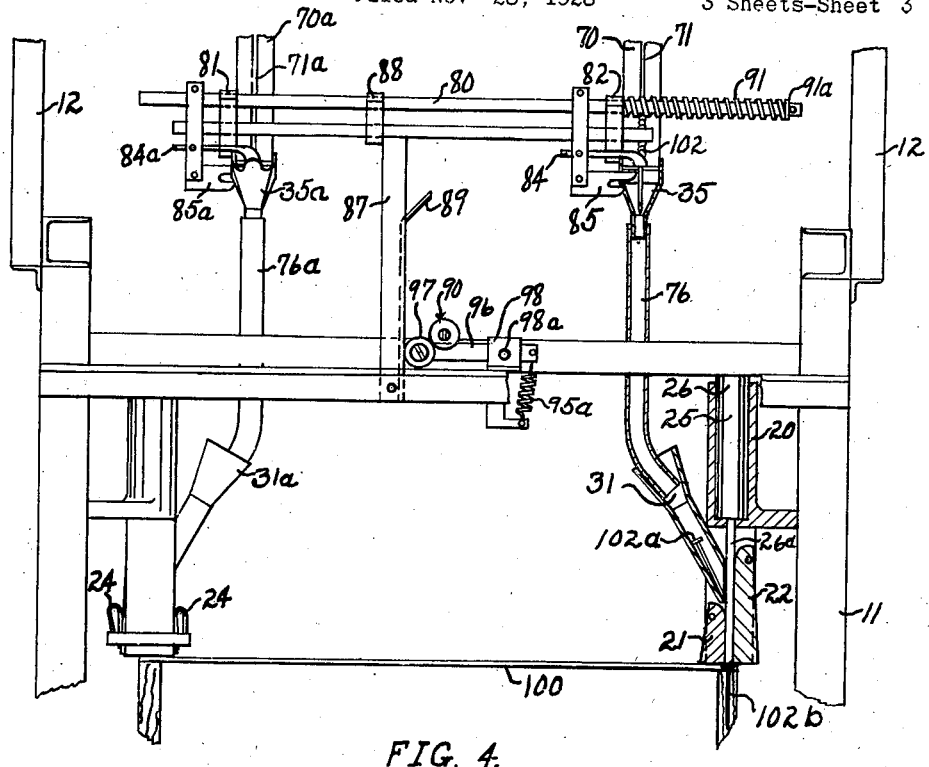
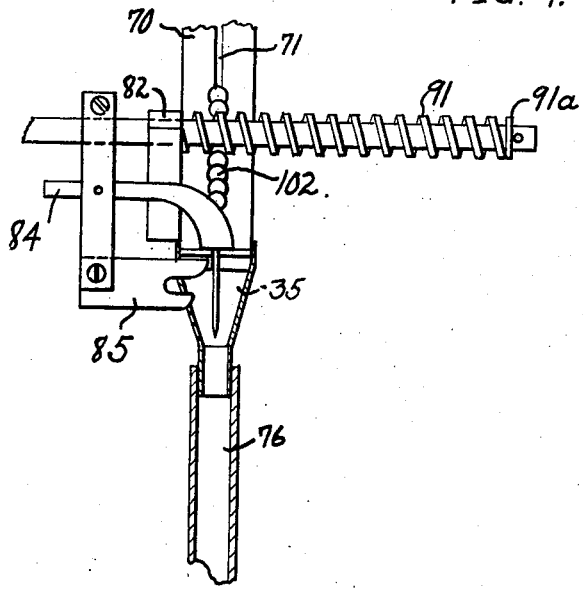
FIG. 4.
FIG. 5.

Patented June 24, 1930

1,766,144

UNITED STATES PATENT OFFICE

HALE PAXTON, OF SANGER, CALIFORNIA

NAIL-PICKING DEVICE FOR NAILING MACHINES

Application filed November 28, 1928. Serial No. 322,522.

My invention relates to a box nailing machine and more specifically to the nail feeding device therein. In box nailing machines the usual method for feeding nails is to position the nails in a nail run or slideway with the points hanging downward and by means of a device which cooperates with the nail driving means to pick single nails from the end of the slideway and deposit them into a conduit, through which conduit said nails slide downward into nail holding means, which latter means positions the nails on the box at the location where the nail is to be driven. In nailing machines of the type described in my applications for patents heretofore filed, to-wit, Compensating device for nail driving mechanism, filed July 21st, 1928, Serial No. 294,339, Box making table, filed July 21st, 1928, Serial No. 294,338, and Shook separator and feeder, filed June 29th, 1928, Serial No. 289,301, the known forms of nail pickers now in common use do not cooperate with the nail driving means at a time adapted to permit the nail to be positioned to receive the descending stroke of the driver, the result being that the driver frequently descends before the nail is positioned and on that stroke no nail is driven, and in a subsequent stroke of the driver two nails are driven together.

The object accomplished in my invention is an advancement of the time of the picking of the nails from the slideway and depositing them in the nail conduit with relation to the movement of the nail driving means so that the nails will have ample time to slide down the conduit and be positioned in the nail holders for driving when the correlated mechanism forces the driver downward against the head of the nail. Other objects attained are its simplicity of action and the fact that it will not easily get out of order. Other objects are hereinafter disclosed.

In the drawing accompanying this application Fig. 1 is a fragmentary front view of my nailing machine showing a general view of my invention.

Fig. 4 is a view of the same elements shown in Fig. 2 illustrating the position of the correlated mechanism when the nail is positioned for driving and the nail check is positioned to permit another nail to slide to the end of the slideway.

Fig. 5 is an enlarged view of the nail picking and guiding device.

Figure 1:
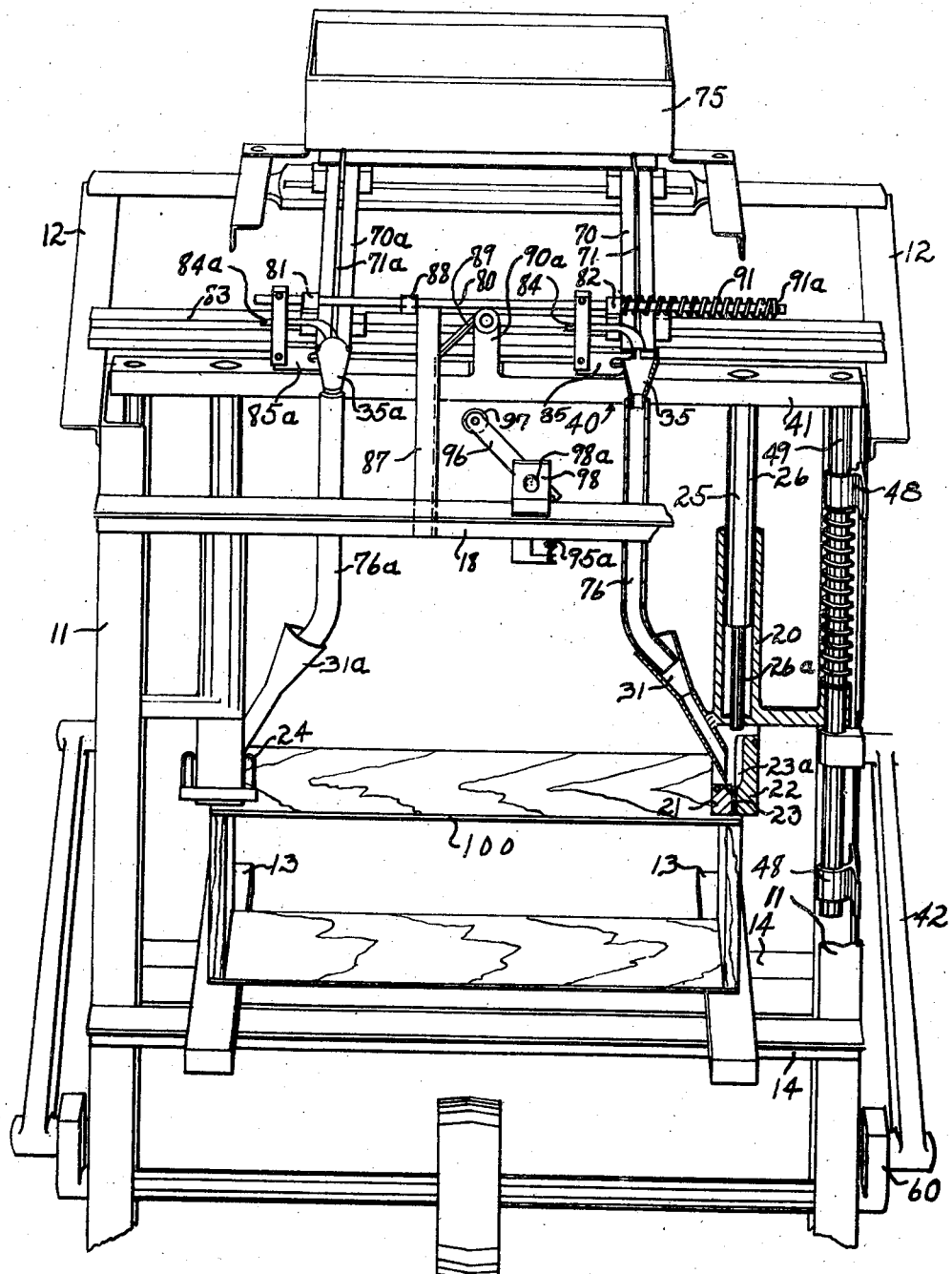

Referring to the drawing, I have formed a frame consisting of upright posts 11 and cross supports 12. A box nailing table thereon consists of beams 13 and 14 rigidly attached to the frame. Above the nailing table is cross bar 18 rigidly attached at either end to upright posts 11.

Referring to the nail feeding mechanism, reference being made to the right hand portions of Figs. 1, 2, 3, and 4, I have provided a funnel 31 adapted to receive in its enlarged end nail transporting conduits 76, said conduits being preferably flexible tubes. The elements designated 31$^a$ and 76$^a$ on the left of the device correspond to the elements 31 and 76. The smaller end of the funnel opens into a small chamber formed by positioning holding blocks 21 and 22 of a well known type with the grooved faces of said blocks adjacent to each other. More specifically, each of said blocks has a vertical groove 23$^a$. When the blocks are assembled the grooves are positioned opposite to each other and are so combined that they form a vertical tapering hole 23 of such diameter that except for the heads of the nails the nails can readily pass therethrough.

Blocks 21 and 22 are held together yieldingly by spring means 24 so that when the driving rod 25 presses the head of the nail downward the blocks yieldingly separate to permit the head of the nail to pass through the opening formed by the groove. Driving rod 25 has an enlarged portion 26 at the upper end which slidingly fits within sleeve 20 and a portion of smaller diameter shown as 26ª. Nail driving rod 25 is actuated by driving head assembly 40, which gives the driving rod a downward movement, which downward movement drives the nail in the nail holding device.

Driving head assembly 40 consists of a horizontal beam positioned directly over the driving rod and adapted to be connected therewith. To the driving head 41 is attached sliding guide rods 49 which are adapted to slide in guides 48, guides 48 being attached to upright posts 11. A connecting rod 42 is pivoted at one end to a crank 60 and at the other end to rod 49 and is adapted by the movement of crank 60 to impart a vertical reciprocating movement to the sliding rod 49, which movement is directly communicated to the driving assembly 40 and by the driving assembly 40 to the nail driving rod 25.

Referring to the nail feeding mechanism, 70 and 70ª are duplicate slideways having therein lateral slots 71 and 71ª therein adapted for nails to be suspended with their heads uppermost, said slideways being positioned on an incline so the nails thus suspended will slide downward therein. Nails are fed to these slideways from nail container 75. The lower ends of the slideways 70 and 70ª are positioned and terminate just above the funnel shaped members 35 and 35ª connected with nail conduits 76 and 76ª so that when a nail is dropped from the end of slideways 70 or 70ª it will fall point downward into said conduits 76 or 76ª.

The row of nails in the slideways are designated 102. The nail shown as picked from the slideway starting down the conduit is 102ª and the positioned nail at he lower end of tube 20 is 102ᵇ.

To regulate the time of and number of nails discharged from the end of the slideways I make use of the following elements:

A rod 80 is positioned so it can slide laterally, parallel with the driving head. Rod 80 is slidably disposed in supports 81 and 82 which supports are attached to a cross beam 83 attached to the frame. Attached to rod 80 are nail checks or stops 84 and 84ª and nail pickers 85 and 85ª. There should be a nail check and nail pick for each slideway. The positions and relative arrangement of the nail check, nail picks and slideway are such that rod 80 can be moved endwise to a position whereby stop 84 covers the end of slot 71 and stop 84ª covers the end of 71ª, thereby checking the nails from being dropped from the end of the slideway. Likewise, by an endwise movement of rod 80, nail pick 85 will cross the slideway and slot 71, and nail pick 85ª will cross slot 71ª and the nail checks. The nail pick is positioned to move under the slideway. When the slideway has nails therein at the lower end the nail pick is positioned to enter the row of nails between the nail at the extreme end of the slideway and the next preceding nail thereto. The nail pick, when positioned across the slideway, functions to hold all of the nails from sliding out of the slideway except the one nail at the end of the slideway. The relative position of the nail picks and the nail checks on rod 80 are such that when the nail check is in operative relation with the slideway, the nail pick is not in operative relation therewith, and when the nail pick is in operative relation with the slideway and nail check is in inoperative position.

It is here noted that in the preferred form of nail driving machines the slideways are positioned on an incline so the nails travel toward the discharge end by gravity power. Rod 80 is positioned at approximately a right angle to the slideways and adjacent to the ends of said slideways.

Rod 80 is actuated by the following elements: A compression spring 91 encircles one end of rod 80. One end of said spring rests against support 82, and the other end of the spring rests against a spring stop 91ª which is attached to rod 80. This spring normally holds the rod in a position whereby the nail check is in inoperative relation with the slideway and the nail pick is in operative relation therewith. A dog 88 is attached to rod 80. A lever 87 is pivoted at one end to a cross bar 18 attached to the frame, and the other end is adapted to engage dog 88 and move the rod with the lever 87 against the tension of spring 91.

Figure 2:
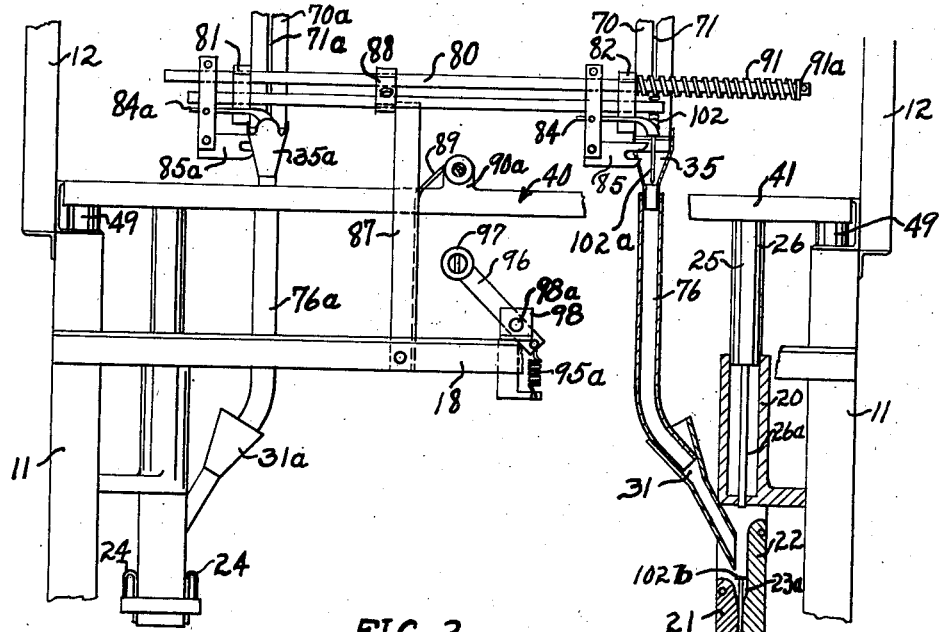
Fig. 2 is an enlarged fragmentary view of a nailing machine showing the relative position of the nail picking device when the nail driving device is at its upward limit in its path of travel.
Figure 3:
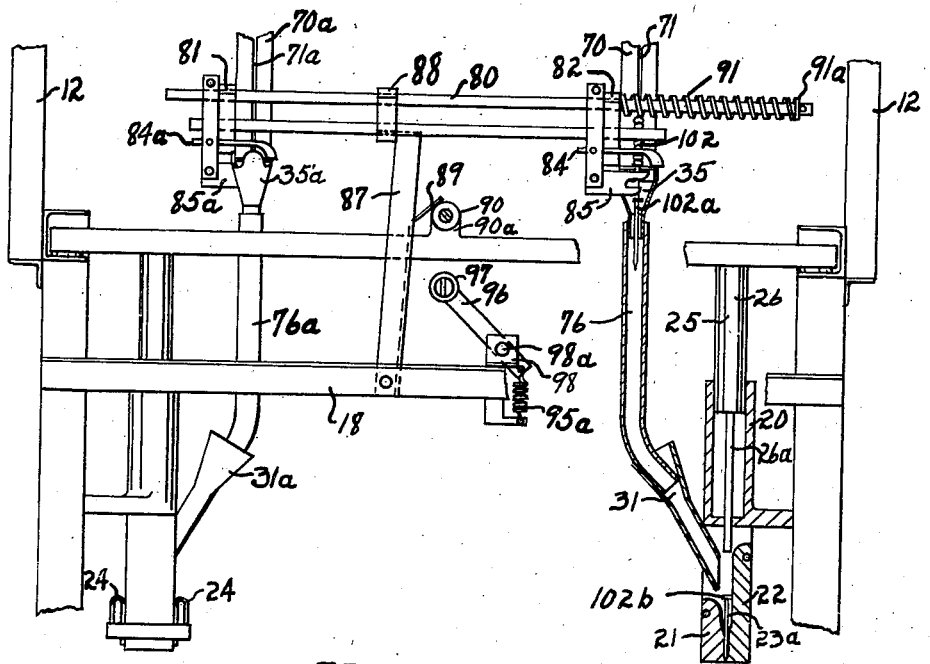
Fig. 3 is a view of the same elements shown in Fig. 2 illustrating the position of the nail picking device and correlated mechanism when the nail is picked and started down the conduit at the start of the downward stroke of the nail driver.

Lever 87 has a lobe 89 near the upper end thereof positioned for engagement by a boss 90. Boss 90 consists preferably of a roller carried on an upright support 90ª attached to the driving head, roller 90 being positioned to engage lobe 89 as it passes it. With the mechanism herein described it will be noted that when boss 90 engages lobe 89, rod 80 is pushed against the stress of spring 91 and the nail check is positioned in cooperative relation with the slideway and the nail pick is positioned in inoperative relation with the slideway, as shown in Fig. 2, thus permitting the nails to slide by gravity force to the end of the slideway until checked by the nail check, and on the downward movement of the boss 90, said boss becomes disengaged with lobe 89 and spring 91 functions to return rod 80 to normal position, which places the nail pick in cooperative relation with the slideway and separates the end nail from the others in the slideway and places the nail check in inoperative relation with the slideway, so that the nail at the end of the slideway separated from the other nails therein can drop therefrom into the nail conduit to be conducted by gravity to the nail positioning blocks.

In the class of nail driving machines where nails are rapidly driven, the time between the positioning of the nail check and the subsequent picking of a nail is too short to permit the nails to slide to the end of the slideway and to adjust themselves so the nail picker can function before the nail picker is actuated, hence I have provided a holding device consisting of a lever 96 pivoted at one end with pivot 98ª to a support 98 which support is attached to the cross beam 18, being a part of the frame. Lever 96 carries a roller 97 at the upper end thereof. As the driving head descends boss 90 engages with roller 97 depressing lever 96 so that roller 97 engages with lever 87, moving and holding it so that in turn it moves rod 80 to a position which places the nail check in operative relation with the slideway, and permits the nail to slide to the end of the slideway to be in position to have one nail picked therefrom. Lever 96 when thus positioned is approximately at right angles with lever 87. Friction between the auxiliary roller 97 and lever 87 holds rod 80 in a position with spring 91 under compression as shown in Fig. 4. As the lever 96 does not push rod 80 to the end of its path of travel, the upward movement of boss 90 and its engagement with lobe 89 will move rod 80 a slight distance further against the spring tension, which releases the friction between lever 87 and roller 97, at which juncture spring 95ª will pull the roller 97 out of position for engagement with lever 87, and on the first portion of the descending stroke of the driving head boss 90 is released from engagement with lobe 89 and the nail pick is actuated.

It is further noted that in nail driving mechines it is necessary to have the upper end of the nail conduit enlarged, or have a funnel member at said top so that the nail discharged from the slideway will be guided therein. In rapid nailing machines the momentum given the nails by the rapid picking means frequently turns the nail over so it drops head downward or deposits it crosswise in the chute. To keep the nails from thus turning I have formed the nail pick wide enough so that when the nail is discharged from the slideway it engages the side of the nail pick and maintains an approximately vertical movement while falling.

The nail pick is shown in enlarged form in Fig. 5. The features to which special attention is called is the width along the line 85 which should be approximately two thirds the length of the nail being driven.

A box form shown in Fig. 1 is numbered 100.

Having described my invention, I claim:

1. In combination with a nailing machine having nail driving means and having a nail feeding device consisting of a slideway adapted to receive nails suspended by their heads permitting them to slide therein, a reciprocating member carrying a nail check and a nail pick adapted to cooperate with said slideway in alternately checking the nails from sliding therein, and releasing the nail at the lower end of the slideway, said reciprocating member being actuated and timed by the nail driving mechanism and by spring means, the means for positioning and holding the nail check in active relation with the slideway being operative on the lower half of the cycle of the nail driving means, and the means for releasing said nail holding means and for simultaneously positioning the nail picking means in active relation with the slideway being actuated by the upper portion of the downward stroke of the nail driving means.

2. In combination with a nailing machine having nail driving means and having a nail feeding device consisting of a slideway adapted to receive nails suspended by their heads and permitting them to slide therein, a reciprocating member carrying a nail check adapted to be positioned to check the nails from dropping from the discharge end of the slideway, and a nail pick adapted to be positioned to enter between the nail at the lower end of the slideway and the nail next adjacent thereto, said reciprocating member being adapted to be moved to position the nail check and the nail pick alternately in operative and in inoperative relation with said slideway, means for timing the movements of the reciprocating member consisting of a detent attached to the reciprocating member, a lever pivoted at one end to the frame of the nailing machine and adapted for the other end to engage said detent, said lever having a lobe thereon, a boss actuated by the nail driving means and adapted to cooperate with the lobe to move the lever to position the nail picking device in inoperative relation with the slideway and the nail check in operative relation with said slideway, spring means adapted to return the reciprocating member to position the nail pick in operative relation with the slideway and the nail check in inoperative relation with the slideway, said lobe being positioned on the lever to adapt the actuation of the lever by said boss when the nail driving means is completing the upper movement of the stroke and is starting on its downward stroke.

3. In combination with a nailing machine having nail driving means and having a nail feeding device consisting of a slideway adapted to receive nails suspended by their heads and permitting them to slide therein to a discharge end thereof, a reciprocating member carrying a nail check adapted to be positioned to check the nails from dropping from the discharge end of the slideway, and a nail pick adapted to be positioned to enter the row of nails within the slideway between the nail at the end of the slideway and the nail next adjacent thereto, said reciprocating member being adapted to position the nail check and the nail pick alternately in operative and in inoperative relation with said slideway, means for timing the movements of the reciprocating member consisting of a detent attached to the reciprocating member, a lever pivoted at one end to the frame of the nailing machine and adapted for the other end to engage said detent, said lever having a lobe thereon, a boss actuated by the nail driving means and adapted to cooperate with the lobe to move the lever to position the nail picking device in inoperative relation with the slideway and the nail check in operative relation with said slideway, spring means adapted to return the reciprocating member to position the nail pick in operative relation with the slideway and the nail check in inoperative relation with the slideway, said lobe being positioned on the lever to adapt the actuation of the lever by said boss when the nail driving means is completing the upper movement of the stroke and is starting on its downward stroke, and an auxiliary swinging member positioned so that it can be engaged by the boss on the downward stroke of the nail driving means, and adapted on such engagement with said boss to engage, move, and hold said lever and the reciprocating member and the nail check so that the nail check is in operative relation with the slideway, until said engagement between the lever and auxiliary swinging member is released.

HALE PAXTON.